US008893548B2

(12) United States Patent
Loomis et al.

(10) Patent No.: US 8,893,548 B2
(45) Date of Patent: Nov. 25, 2014

(54) SMART-PHONE BRACKET FOR CAR AND TRUCK NAVIGATION

(71) Applicants: Peter Van Wyck Loomis, Sunnyvale, CA (US); Morrison Ulman, Los Altos, CA (US)

(72) Inventors: Peter Van Wyck Loomis, Sunnyvale, CA (US); Morrison Ulman, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 144 days.

(21) Appl. No.: 13/850,185

(22) Filed: Mar. 25, 2013

(65) Prior Publication Data
US 2013/0220010 A1 Aug. 29, 2013

Related U.S. Application Data

(60) Division of application No. 13/118,801, filed on May 31, 2011, now Pat. No. 8,467,967, which is a continuation-in-part of application No. 12/868,604, filed on Aug. 25, 2010, now Pat. No. 8,406,996.

(51) Int. Cl.
G01C 21/00 (2006.01)
B60R 11/02 (2006.01)
G01C 21/26 (2006.01)

(52) U.S. Cl.
CPC ......... B60R 11/0258 (2013.01); B60R 11/0241 (2013.01); G01C 21/26 (2013.01); G01C 21/265 (2013.01)
USPC ....................................................... 73/178 R

(58) Field of Classification Search
None
See application file for complete search history.

(56) References Cited

U.S. PATENT DOCUMENTS

| 5,504,482 | A | * | 4/1996 | Schreder .................. 340/995.13 |
| 5,777,580 | A | * | 7/1998 | Janky et al. .................... 342/457 |
| 6,690,268 | B2 | * | 2/2004 | Schofield et al. ............. 340/438 |
| 7,579,939 | B2 | * | 8/2009 | Schofield et al. .......... 340/425.5 |
| 7,583,184 | B2 | * | 9/2009 | Schofield et al. ............. 340/438 |
| 7,603,255 | B2 | * | 10/2009 | Case et al. ..................... 702/182 |
| 7,650,252 | B2 | * | 1/2010 | Douglas .......................... 702/95 |
| 7,982,767 | B2 | * | 7/2011 | Berson et al. ................. 348/144 |
| 2007/0067137 | A1 | | 3/2007 | Ohkubo |
| 2009/0309793 | A1 | | 12/2009 | Loomis |
| 2009/0312975 | A1 | | 12/2009 | Wyck Loomis |
| 2012/0048014 | A1 | * | 3/2012 | Loomis et al. .................. 73/384 |

* cited by examiner

Primary Examiner — Lisa Caputo
Assistant Examiner — Jermaine Jenkins
(74) Attorney, Agent, or Firm — NUPAT, LLC; Morrison Ulman

(57) ABSTRACT

Inertial navigation systems for wheeled vehicles with constrained motion degrees of freedom are described. Various parts of the navigation systems may be implemented in a smart-phone.

18 Claims, 10 Drawing Sheets

US 8,893,548 B2

SMART-PHONE BRACKET FOR CAR AND TRUCK NAVIGATION

RELATED APPLICATIONS

This application is a division of U.S. patent application Ser. No. 13/118,801 ("Smart-phone bracket for car and truck navigation") filed on May 31, 2011 and incorporated herein by reference, which is a continuation-in-part of U.S. patent application Ser. No. 12/868,604 ("Cordless inertial vehicle navigation") filed on Aug. 25, 2010 and incorporated herein by reference.

TECHNICAL FIELD

The disclosure is generally related to inertial navigation systems for wheeled vehicles with constrained motion degrees of freedom.

BACKGROUND

Car and truck navigation systems based on global positioning system (GPS) receivers have become indispensable aids for both business and pleasure driving. Such systems do not work well, however, when signals from GPS satellites are obscured or unavailable as may happen when driving in a tunnel or urban canyon environment. To combat problems from GPS signal loss, inertial measurement units (IMU) are combined with GPS receivers to provide dead reckoning as a supplement to satellite navigation.

Many of the hardware components necessary to implement a GPS+IMU system are present in so-called "smart" cell phones, personal digital assistants or tablet computers. We use "smart-phone" as short hand to refer to any of these kinds of devices. What is needed are systems and methods to implement a GPS+IMU system for car or truck navigation taking advantage of the display, processor and sensors found in typical smart-phone.

DETAILED DESCRIPTION

Introduction

Figure 1:
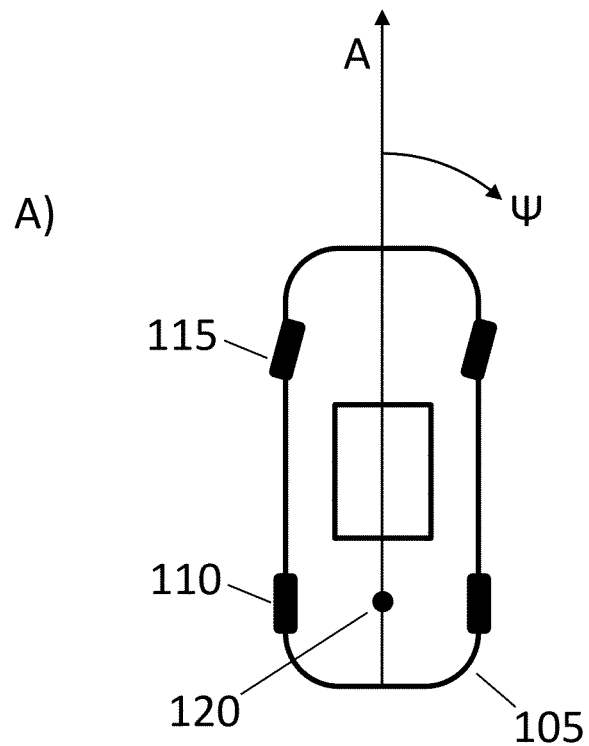
FIGS. 1A and 1B show a wheeled vehicle that has yaw, longitudinal acceleration and rate-of-climb degrees of freedom.
Figure 1:
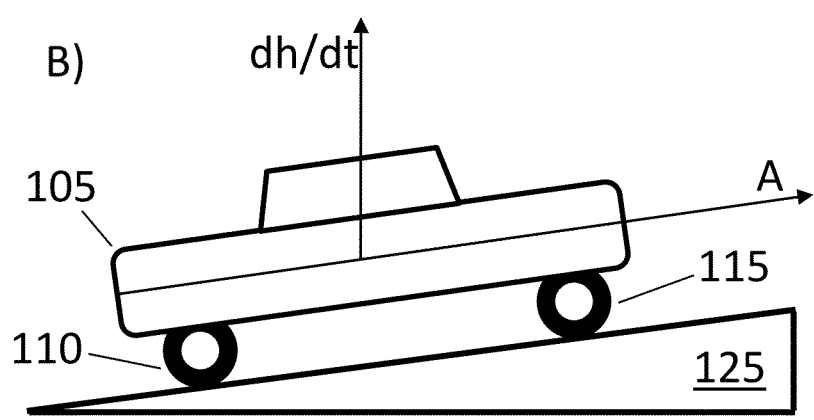

U.S. patent application Ser. No. 12/868,604, "Cordless inertial vehicle navigation" (filed on Aug. 25, 2010 and incorporated herein by reference) describes systems and methods for inexpensive GPS+IMU navigation in cars and trucks. ("Cordless" refers to the elimination of a connection to a vehicle's speedometer or tachometer.) Cars and trucks present a special case because their motion is constrained and lateral acceleration, vertical acceleration and roll may all be ignored. The description found in U.S. Ser. No. 12/868,604 is repeated below in Part 1: Cordless inertial vehicle navigation.

Smart-phones (including personal digital assistants and tablet computers) often include most (sometimes all) of the components necessary to implement systems such as those described in Cordless inertial vehicle navigation. Basic smart-phones may include a display, processor, memory, GPS receiver and accelerometer, for example. More advanced models may include a gyroscope. In the near future smart-phones may even be equipped with pressure altimeters.

Although the systems described in Cordless inertial vehicle navigation are self-calibrating, they depend on the spatial relationship between measurement and body frames of reference being fixed. Thus the smart-phone bracket for car and truck navigation described below (in Part 2: Smart-phone bracket for car and truck navigation) performs two basic functions: (1) it provides a temporary, rigid attachment for a smart-phone to a vehicle; and, (2) it supplies sensors that may be missing in the smart-phone.

A variation of the smart-phone bracket places all of the inertial sensors needed for car and truck navigation in a sensor unit that is fixed to a vehicle and communicates wirelessly with a smart-phone. In this case, the smart-phone is used for data processing and display, and is free to move about the cabin of the vehicle.

Part 1: Cordless Inertial Vehicle Navigation

One way to build a cordless GPS+IMU navigation system is to combine measurements from GPS, 3-axis rotation rate gyros and 3-axis accelerometers in a Kalman filter or similar estimation algorithm. Such systems have been studied for decades and are routinely employed in aerospace navigation.

Practical difficulties arise, however, when cost is a significant design criterion. Rate gyros and accelerometers based on micro-electromechanical systems (MEMS) are attractive because of their compact size and low cost. Unfortunately MEMS gyros build up milliradian level errors quickly. A one milliradian vertical error leads to a one centimeter per second squared horizontal acceleration error—an effect that quickly degrades positioning accuracy. Thus, a traditional GPS+IMU system design is not optimal for cars and trucks because of errors in low-cost sensors.

A solution to the problem of building a low cost cordless GPS+IMU navigation system having acceptable accuracy for cars and trucks depends in part on recognition of constraints inherent in the typical motion of these vehicles. FIGS. 1A and 1B show a wheeled vehicle that has yaw, longitudinal acceleration and rate-of-climb degrees of freedom.

In FIG. 1, a wheeled vehicle 105, e.g. a car or truck, is shown in plan (A) and profile (B) views. The vehicle has four wheels, two of which are not steerable (e.g. 110) and two of which are steerable (e.g. 115). (Wheeled vehicles may also have three, four or more wheels, one or more of which may be steerable.) When the vehicle turns it yaws around a pivot point 120 located approximately halfway between the non-steerable wheels. In FIG. 1B the vehicle is seen driving on a hill 125.

The vehicle shown in FIG. 1 has three degrees of freedom: yaw, ψ; longitudinal acceleration, A; and rate-of-climb, dh/dt. Motion of the vehicle is affected by a steering wheel that controls yaw rate, stop and go pedals that control longitudinal acceleration, and by terrain, i.e. hills and valleys, that affect rate-of-climb. These motions may be measured with a yaw gyro, a longitudinal accelerometer and an altimeter, all of which may be MEMS devices.

It is not necessary to measure roll, lateral acceleration or vertical acceleration, and omitting such measurements eliminates the accumulation of their associated measurement errors. In cars, trucks and similar wheeled vehicles lateral acceleration is safely assumed to be equal to centripetal acceleration. These simplifications are not applicable to bicycles and motorcycles (which do experience significant roll) or other unconstrained objects.

Figure 2:
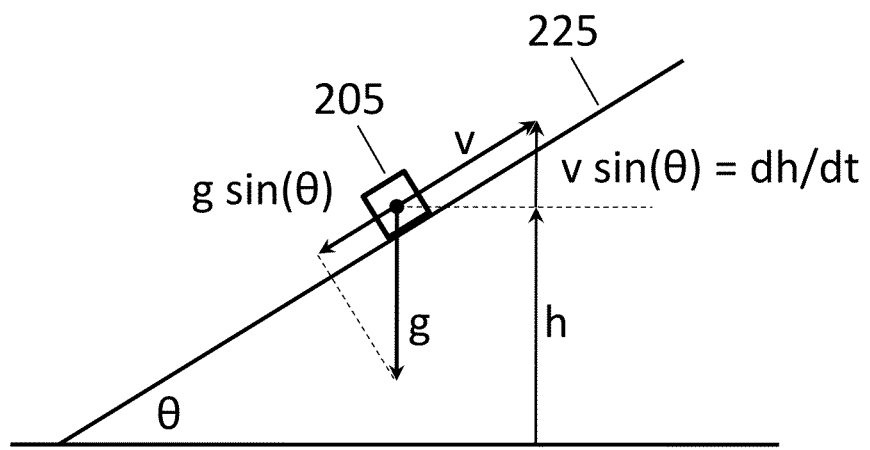
FIG. 2 is a diagram showing geometric relationships associated with estimating speed with a longitudinal accelerometer and an altimeter.

Given a vehicle with longitudinal acceleration and rate-of-climb degrees of freedom, dead reckoning based on a longitudinal accelerometer and an altimeter is one possible way to estimate speed. FIG. 2 is a diagram showing geometric relationships associated with estimating speed in this manner. In FIG. 2, a vehicle 205 (illustrated simply as a square block) is travelling on a slope 225. The angle of the slope with respect to the horizon is e, the height of the vehicle (above mean sea level or any other convenient reference plane) is h, and the speed of the vehicle on the slope is v.

Inspection of FIG. 2 reveals that:

$$\frac{dv}{dt} = A - g\sin\theta \text{ and } \sin\theta = \frac{1}{v}\frac{dh}{dt}$$

where g is the acceleration due to gravity near the surface of the earth and A is the longitudinal acceleration of the vehicle. Therefore, $$\frac{dv}{dt} = A - \frac{g}{v}\frac{dh}{dt}$$

and thus speed may be estimated given measurements of longitudinal acceleration and height. A difficulty of this approach, however, is the singularity at v=0. The cordless GPS+IMU navigation system described here avoids zero speed problems by adding a pitch gyro and combining altimeter, longitudinal accelerometer and pitch gyro measurements in a Kalman filter.

The cordless GPS+IMU system is designed to be self calibrating such that it may be placed in a vehicle without careful alignment of the MEMS gyros and accelerometer to the vehicle's axes. Self calibration is the process by which relationships between IMU, vehicle and earth-fixed reference frames are established.

The measurement reference frame M(x, y, z) is the frame in which accelerometer and rate gyro measurements are made. The vehicle or body reference frame B(f, r, d) ["forward", "right", "down"] is the frame aligned with the axes of the vehicle in which the cordless GPS+IMU system operates. The earth-fixed reference frame E(E, N, U) ["East", "North", "Up"] is the frame of reference in which GPS measurements are reported.

Two examples of methods for self calibration are described. The first is blind calibration in which the orientation of body frame B is found in terms of measurement frame M. The second is delta-V calibration in which the orientation of measurement frame M is found in terms of earth-fixed frame E, and the orientation of body frame B is also found in terms of earth-fixed frame E. This information is then used to find the orientation of body frame B in terms of measurement frame M.

In blind calibration the direction of greatest acceleration (M frame) measured over a period of a few minutes lies along the vertical (yaw) axis (B frame). The direction along which changing acceleration (M) is observed when yaw is near zero is the longitudinal (roll) axis (B). Finally, the lateral (pitch) axis (B) is perpendicular to the other two axes.

In delta-V calibration the orientation of measurement frame M is found in terms of earth-fixed frame E by matching changes in velocities measured by IMU sensors and by GPS. Next, the orientation of body frame B is found in terms of earth-fixed frame E. Because of "rubber wheel" constraints, the B forward ("f") direction is equal to the direction of the GPS (E frame) velocity at any moment. (Rubber wheel vehicles do not slide sideways.) The average (over a few minutes) B down ("d") direction is parallel to the E frame up ("U") direction. Finally, the lateral (pitch) axis (B) is perpendicular to the other two axes. Once M and B are both known in terms of E, the relationship between M and B may be deduced.

Other calibration methods are possible. In general, the relationship between the vertical axes of the body and measurement frames may be deduced from the direction of greatest acceleration (M frame) measured over a period of a few minutes. This direction is parallel to the vertical (yaw) axis (B frame). The longitudinal (roll) axis (B frame) may then be determined by comparing accelerations measured by MEMS accelerometers to accelerations determined from a history of position measurements reported by a position sensor such as a GNSS receiver.

Yaw rate gyro measurements may be used to improve the accuracy of longitudinal (roll) axis determination because lateral acceleration as measured by yaw rate multiplied by speed ($\omega_\psi v$) is, in practice, more accurate than lateral acceleration determined by differencing GNSS speed measurements ($\Delta v$).

When a horizontal acceleration, A, is measured in both the M (x, y) frame (by accelerometers) and the B (f, r) frame (by GNSS speed differences), components $A_f, A_r, A_x$ and $A_y$ of the acceleration are related by:

$$\begin{bmatrix} A_f \\ A_r \end{bmatrix} = \begin{bmatrix} \cos c & \sin c \\ -\sin c & \cos c \end{bmatrix} \begin{bmatrix} A_x \\ A_y \end{bmatrix}$$

where c is the constant angle that best satisfies the relationship over time. Alternatively, the angle between the M and B frames in the horizontal plane may be calculated as: a tan $2(A_f, A_r)$–a tan $2(A_x, A_y)$.

A previously self-calibrated cordless GPS+IMU system may use calibration information stored in memory to speed up self calibration procedures. Even after self calibration has determined the relative orientation of the M and B reference frames, the position of the cordless GPS+IMU system within a vehicle may affect IMU sensor measurements. For example, a horizontal acceleration error occurs during turns if a longitudinal accelerometer is located away from the pivot point of a vehicle.

Figure 3:
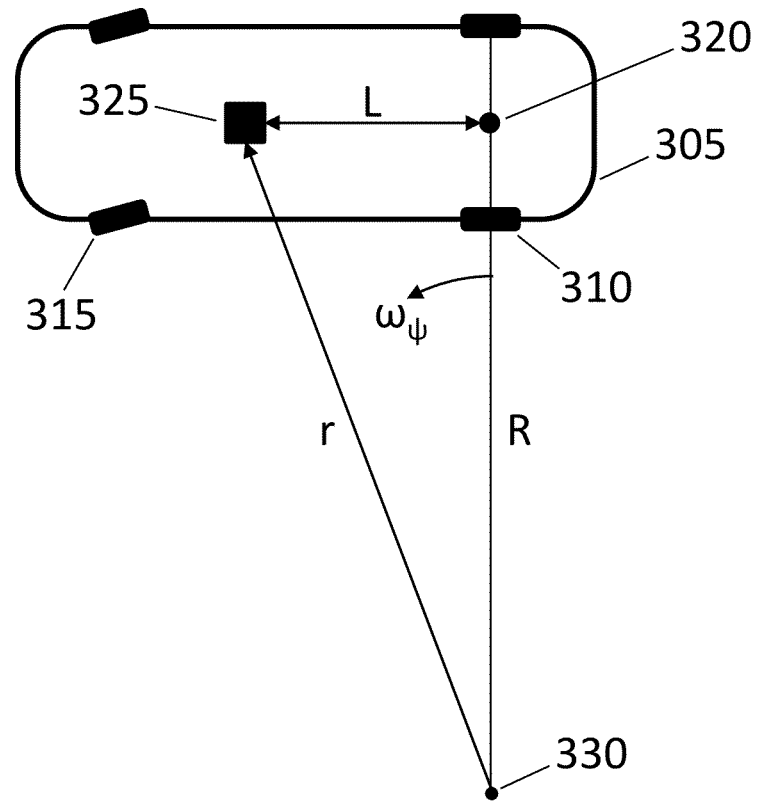
FIG. 3 is a diagram showing geometric relationships associated with errors that occur in measurements of longitudinal acceleration in a turning vehicle.

FIG. 3 is a diagram showing geometric relationships associated with errors that occur in measurements of longitudinal acceleration in a turning vehicle. In FIG. 3 a wheeled vehicle 305, e.g. a car or truck, is shown executing a turn. The vehicle has non-steerable wheels (e.g. 310) and steerable wheels (e.g.

315). The vehicle's pivot point 320 lies halfway between the non-steerable wheels. A longitudinal accelerometer is represented by block 325; it is located a distance L ahead of the pivot point. (L is referred to as "accelerometer arm", for lack of a better term.) The radius of turn of the vehicle is R, the distance from the center of the turn 330 to the longitudinal accelerometer is r, and the rate of turn (i.e. the vehicle's yaw rate) is $\omega_\psi$. The centrifugal force at the accelerometer is $\omega_\psi^2 r$, and the longitudinal component of this force, which is what is measured by the longitudinal accelerometer, is $$\omega_\psi^2 r \frac{L}{R} \sim \omega_\psi^2 L.$$

This error is removed in the cordless GPS+IMU navigation system by subtracting $\omega_\psi^2 L$ from longitudinal accelerometer measurements.

The cordless GPS+IMU navigation system thus operates under several practical constraints summarized in Table 1:

TABLE 1

GPS + IMU system constraints.

| Constraint | Consequence |
|---|---|
| Low-cost MEMS sensors. | Gyro and accelerometer measurement errors accumulate quickly. |
| Wheeled vehicle (e.g. car or truck). Lateral acceleration may be considered equal to centripetal acceleration. | Lateral acceleration, vertical acceleration and roll are ignored. No roll rate gyro needed. |
| Need to estimate both zero and non-zero speeds accurately. | Pitch rate, altimeter and longitudinal acceleration measurements are combined to avoid zero speed singularity. |
| System may be placed in a vehicle without careful alignment to vehicle axes. | System self-calibrates sensors to establish relative orientation of measurement and body frames of reference. |
| Longitudinal accelerometer may be mounted away from vehicle pivot point. | Longitudinal accelerometer measurements are corrected for longitudinal component of centrifugal force in turns. |

Figure 4:
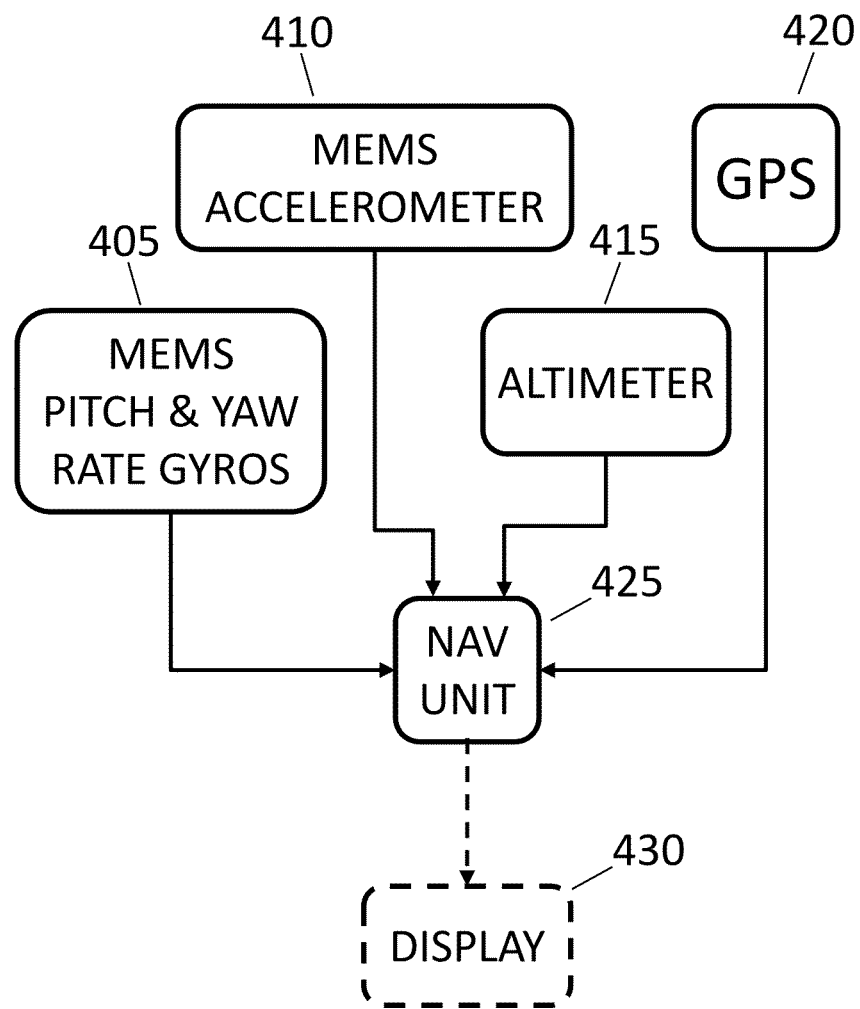
FIG. 4 is a block diagram of a cordless GPS+IMU system.

FIG. 4 is a block diagram of a cordless GPS+IMU system that operates in accordance with all of the constraints of Table 1. In FIG. 4, MEMS pitch rate and yaw rate gyros 405, MEMS accelerometer 410, altimeter 415 and GPS receiver 420 all provide measurement inputs to navigation unit 425. The navigation unit contains a processor that uses a Kalman filter to combine measurement inputs to estimate position, heading and speed. The navigation unit may be connected to an optional display 430. The navigation unit includes a memory which may contain map information; the map information may be used for map-matching to improve positioning accuracy on roads. The system may also include a wireless communication unit to transmit vehicle position and speed information to others. The entire cordless GPS+IMU system may be contained in a compact package that may be quickly and conveniently placed on a vehicle dashboard, for example. The system may also be implemented in a personal digital assistant, smart phone, or other general purpose device having the necessary sensors.

MEMS, six-degree-of-freedom combination rate gyro and accelerometer units are readily available at low cost. After self-calibration procedures described above, the output from one of these units may be manipulated to create that of a virtual longitudinal accelerometer, pitch rate gyro and yaw rate gyro oriented in the B reference frame. The constraints of wheeled vehicles and low-cost MEMS sensors (see e.g. FIG. 1 and Table 1) create a situation in which using only these three measurements (i.e. ignoring lateral and vertical acceleration, and roll) is preferable to using measurements along all six possible axes.

The navigation unit executes a Kalman filter to combine IMU and GPS measurements. The filter is arranged such that altimeter rate is the measurement variable, and gyro and accelerometer measurements are control variables that appear in the state dynamics equations. Vehicle speed is determined through the combination of longitudinal acceleration, pitch rate and altimeter measurements. Some of the state variables are measured by GPS when GPS signals are available. Lateral acceleration, vertical acceleration, and roll rate are not used in the filter.

Kalman filter states, dynamics equations and measurement equations are presented in Tables 2 through 5:

TABLE 2

Kalman filter state variables and dynamics equations.

| State Description | State Variables | State Dynamics Equations |
|---|---|---|
| East | E | $\dot{E} = v \sin \gamma \cos \theta$ |
| North | N | $\dot{N} = v \cos \gamma \cos \theta$ |
| Up | U | $\dot{U} = v \sin \theta$ |
| Speed | v | $\dot{v} = A - \beta_A + \nu_v - g \sin \theta - \omega_\psi^2 L$ |
| Heading | γ | $\dot{\gamma} = (\omega_\psi - \beta_\psi + \nu_\psi)/\cos \theta$ |
| Pitch | θ | $\dot{\theta} = \omega_\theta - \beta_\theta + \nu_\theta$ |
| Accelerometer arm | L | $\dot{L} = 0$ |
| Accelerometer bias | $\beta_A$ | $\dot{\beta}_A = 0 + \nu_A$ |
| Yaw rate gyro bias | $\beta_\psi$ | $\dot{\beta}_\psi = 0 + \nu_\psi$ |
| Pitch rate gyro bias | $\beta_\theta$ | $\dot{\beta}_\theta = 0 + \nu_\theta$ |
| Altimeter rate bias | $\beta_h$ | $\dot{\beta}_h = 0 + \nu_h$ |

TABLE 3

Kalman filter control variables.

| Control Description | Control Variables | |
|---|---|---|
| Yaw rate gyro measurement | $\omega_\psi$ | Control Variables appear in State Dynamics Equations |
| Pitch rate gyro measurement | $\omega_\theta$ | |
| Longitudinal accelerometer measurement | A | |

TABLE 4

Kalman filter measurement variable and measurement equation.

| Measurement Description | Measurement Variable | Measurement Equation |
|---|---|---|
| Altimeter rate | $\dot{h}$ | $\dot{h} = v \sin \theta - \beta_h + \nu_h$ |

TABLE 5

Kalman filter GPS measurement variables and measurement equations.

| GPS Measurement Description | GPS Measurement Variables | GPS Measurement Equations |
|---|---|---|
| East | E(GPS) | $E(GPS) = E_{GPS} + v_{E_{GPS}}$ |
| North | N(GPS) | $N(GPS) = N_{GPS} + v_{N_{GPS}}$ |
| Speed | v(GPS) | $v(GPS) = \sqrt{\dot{E}^2_{GPS} + \dot{N}^2_{GPS} + \dot{U}^2_{GPS}} + v_{v_{GPS}}$ |
| Heading | γ(GPS) | $\gamma(GPS) = \operatorname{atan}(\dot{E}_{GPS}/\dot{N}_{GPS}) + v_{\gamma_{GPS}}$ |
| Pitch | θ(GPS) | $\theta(GPS) = \operatorname{asin}(\dot{U}_{GPS}/\dot{v}_{GPS}) + v_{\theta_{GPS}}$ |

In Tables 2 through 5, $$\dot{X} = \frac{dX}{dt}.$$

$\beta_X$ is the bias associated with variable X.

Biases change over a period of minutes and may be affected, for example, by temperature. $v_x$ is the process noise associated with variable X. X(GPS) is state variable X when GPS fix information is available. $X_{GPS}$ is the value of variable X as determined by GPS.

Table 2 lists state variables and their corresponding state dynamics equations. When GPS signals are available, state variables E, N, U, v, γ and θ are determined by GPS as presented in Table 5. When GPS signals are not available, estimates for the state variables are updated according to the dynamics equations.

Control variables, determined by IMU measurements, are presented in Table 3. The measurement variable (altimeter rate) and corresponding measurement equation are presented in Table 4.

If GPS pseudorange and Doppler measurements are used instead of computed GPS fixes, then GPS clock bias and frequency are included in Kalman filter state equations as presented in Table 6:

TABLE 6

Kalman filter GPS state variables and dynamics equations.

| State Description | State Variables | State Dynamics Equations |
|---|---|---|
| GPS clock bias | B | $\dot{B} = f$ |
| GPS clock frequency | f | $\dot{f} = 0 + v_f$ |

Figure 5:
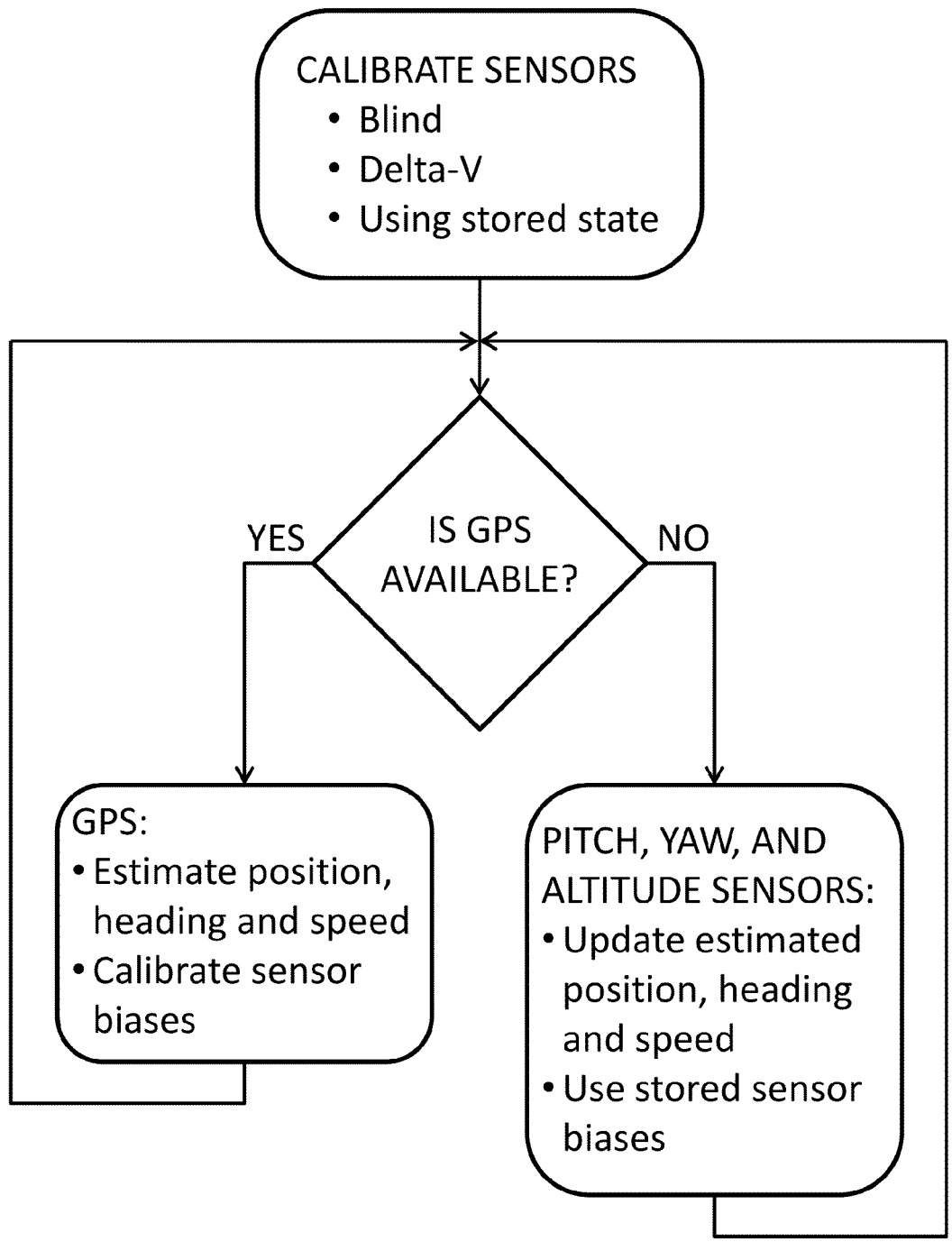
FIG. 5 is a flow diagram for operation modes of a cordless GPS+IMU system.

FIG. 5 is a flow diagram for operation modes of a cordless GPS+IMU system. The system self calibrates its sensors and provides position heading and speed estimates based on GPS and/or IMU sensor measurements.

When the system awakes from being in an off state, the navigation unit self calibrates the IMU sensors. This may be done by retrieving the last stored state of the Kalman filter from memory and calibrating pitch, yaw and altitude sensor biases based on stored information. If the navigation unit is automatically turned on when a vehicle is turned on, it is often safe to assume that wake-up happens when the vehicle is not moving, thus making recalibration simpler. Alternatively, or in addition, calibration may be done using the blind and/or delta-V techniques described above.

If external position information from GPS is available (e.g. from GPS 420), as is the case when several GPS satellites are in view, the navigation unit uses GPS to estimate position, heading and speed, and also to calibrate pitch, yaw, altitude and acceleration sensor biases. Accelerometer arm, L, is also estimated. Optionally, an initial value for L may be input manually.

If external position information is not available, as is the case when driving in a tunnel, for example, the navigation unit uses stored sensor bias information and pitch, yaw, altitude and acceleration sensor measurements to update estimated position, heading and speed.

In conclusion, a cordless GPS+IMU navigation system has been described. The system uses three sensors (pitch rate, altitude and longitudinal acceleration) to estimate speed in the absence of GPS input. The system is self calibrating and corrects for errors due to distance away from the yaw axis of a vehicle. The entire system may be contained in a compact package that may be quickly and conveniently mounted in a vehicle without the need for careful alignment with vehicle axes. The system may also be implemented in a personal digital assistant, smart phone, or other general purpose device having the necessary sensors.

Although the disclosure has discussed satellite based navigation in terms of GPS receivers, clearly other global navigation satellite system (GNSS) (e.g. GLONASS, Galileo, Compass, etc.) receivers may be used instead of, or in combination with, GPS.

Part 2: Smart-Phone Bracket for Car and Truck Navigation

As discussed above, a GPS+IMU system for cars and trucks uses yaw-rate and pitch-rate gyros, a longitudinal accelerometer, an altimeter and a GPS receiver. Many smart-phones contain accelerometers and GPS receivers. Some also include gyros, and a few have altimeters. All of them have processors, memory, displays and wireless communication capability. Thus, a GPS+IMU system may be implemented in a smart-phone if missing sensor measurements (if any) are made available.

It is possible, in theory, to keep track of a smart-phone's location and orientation using inertial sensor data. In practice, however, sensor errors accumulate rapidly and positioning accuracy quickly degrades. For car and truck navigation, the limitations inherent in the cheap (usually MEMS) inertial sensors found in smart-phones may be overcome by recognizing that the motion of a vehicle driving on a road is constrained. Lateral acceleration, vertical acceleration and roll may all be ignored.

To take advantage of the constrained motion of a vehicle, the sensors used in vehicle navigation must be fixed with respect to the vehicle. The motion of a smart-phone held in a person's hand, perhaps waving around, inside a car is far more complex than the motion of the car itself. Thus a smart-phone bracket provides a temporary, rigid attachment between a smart-phone and a vehicle so that sensors in the smart-phone sense vehicle motion rather than arbitrary motion.

Figure 6:
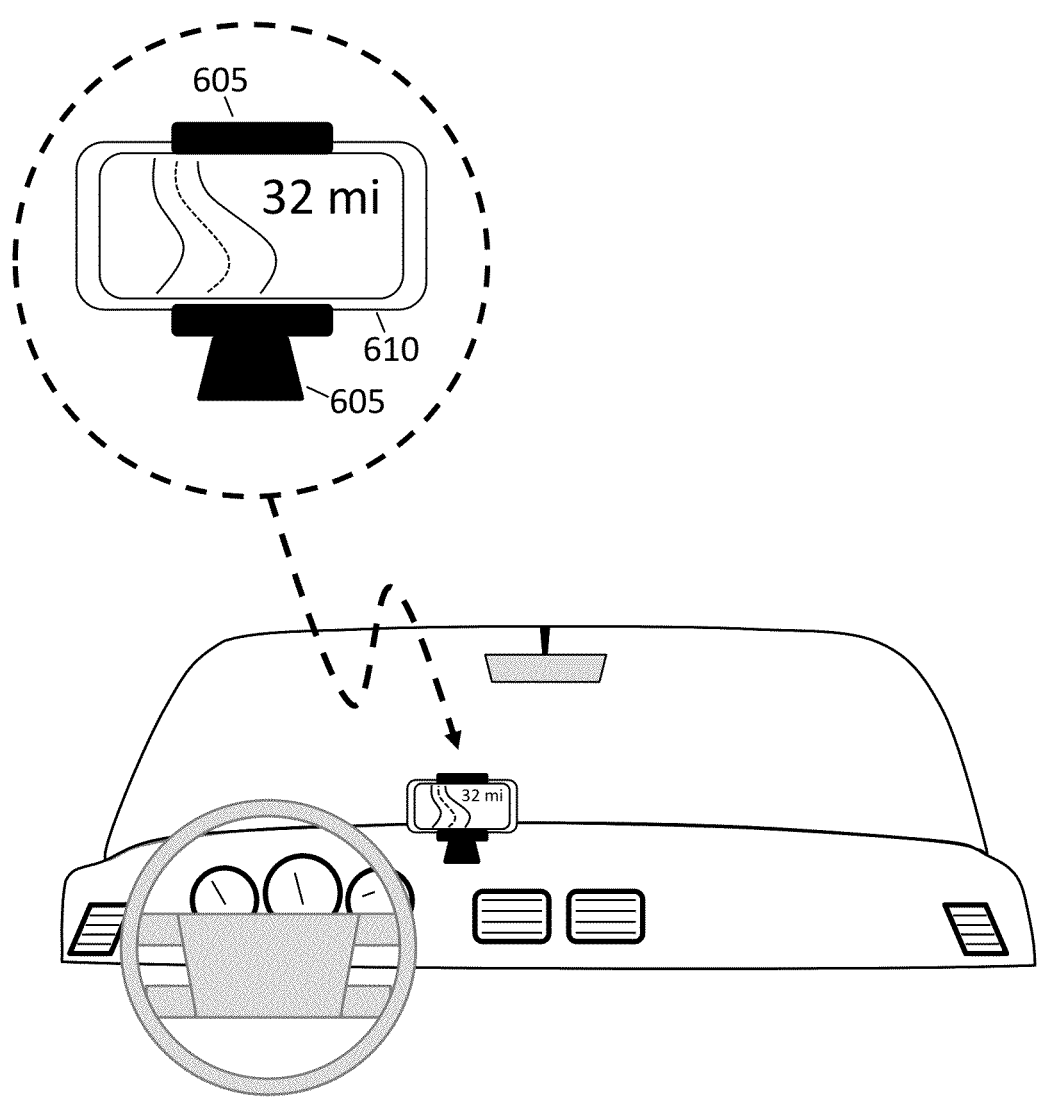
FIG. 6 shows an example of a smart-phone bracket for car and truck navigation.

FIG. 6 shows an example of a smart-phone bracket for car and truck navigation. Bracket 605 holds smart-phone 610. In FIG. 6, the bracket is attached to the dashboard of a car; however, the bracket could be attached to any other part of the car. The bracket may be attached to the inside of the windshield by a suction cup, for example; or it may be designed to mate with air vents, cup holders, a rear-view mirror, steering column, etc. Mechanically, the function of the bracket is to prevent relative motion between the smart phone that it holds and the vehicle to which it is attached. A wide variety of brackets with suitable mechanical properties are readily available; however, conventional brackets do not include sensors for vehicle navigation.

Figure 7:
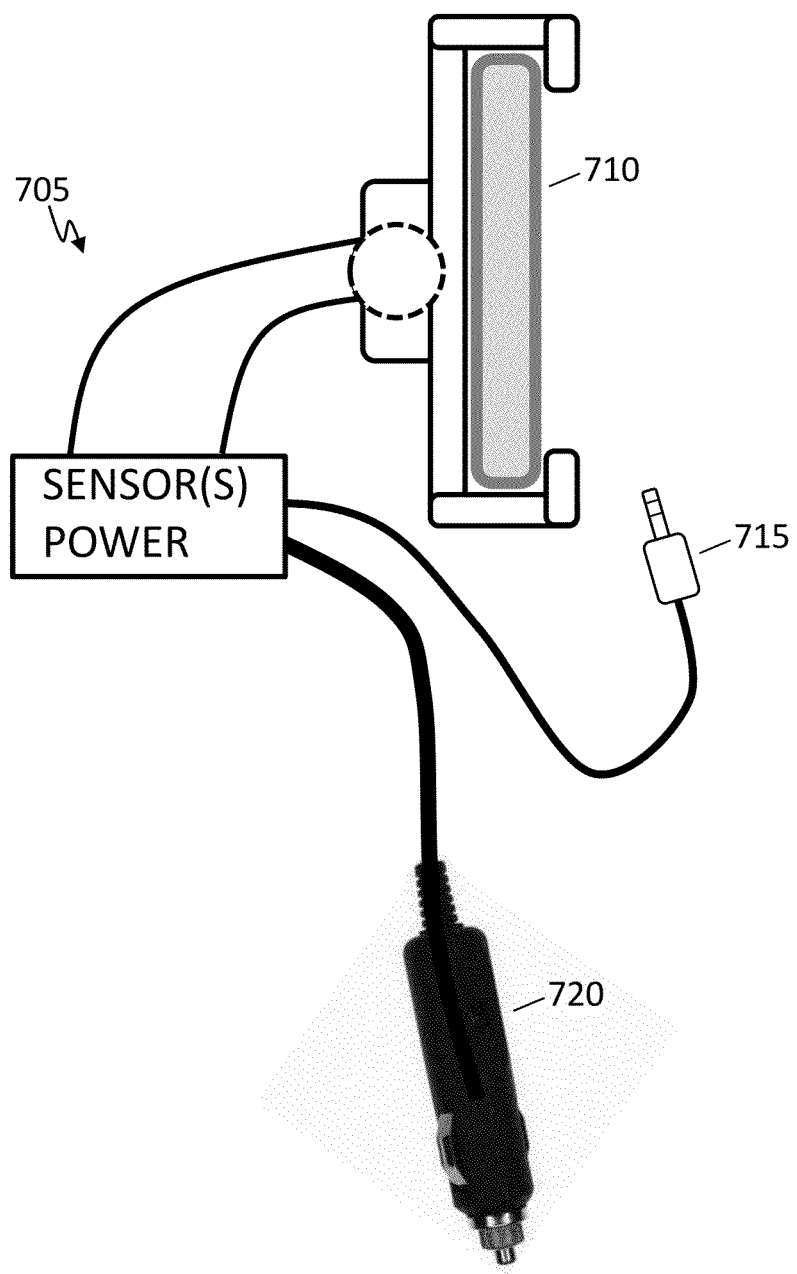
FIG. 7 shows an example of a smart-phone bracket for car and truck navigation having wired connections for power and sensor input/output.

FIG. 7 shows an example of a smart-phone bracket for car and truck navigation having wired connections for power and sensor input/output. In FIG. 7, bracket 705 holds smart-phone 710. Bracket 705 includes sensors such as an altimeter or rate gyro. Communications between the sensor(s) and the smart-phone are carried by a wire 715 that plugs into the smart-phone. Wire 715 may also carry electrical power from the bracket to the smart-phone or vice versa. (Wire 715 may include any number of conductors as needed for data and power transmission.) Optional wire 720 connects the bracket to a vehicle power source such as a cigarette lighter socket.

Many variations are possible in the system of FIG. 7. The sensors in bracket 705 may include any of: accelerometers, gyros, GPS receiver, or altimeter. Usually the bracket supplies sensors that are not included in a smart-phone with the most common example being an altimeter.

Bracket 705 may obtain power from a vehicle; e.g. via optional wire 720. The bracket may then supply power to its sensors, to a smart-phone, or to both. Wire 715 may supply power to a smart-phone or take power from a smart-phone to power sensors in the bracket.

Wire 715 provides data communications between sensors in the bracket and a processor in a smart-phone. The data may be carried over a serial port. Data and power may also be carried to and from a smart-phone as audio frequency electrical signals. A smart-phone's audio input and output provide convenient analog-to-digital and digital-to-analog interfaces for transmitting kilohertz-rate data. The audio output may also provide several milliwatts of power.

Figure 8:
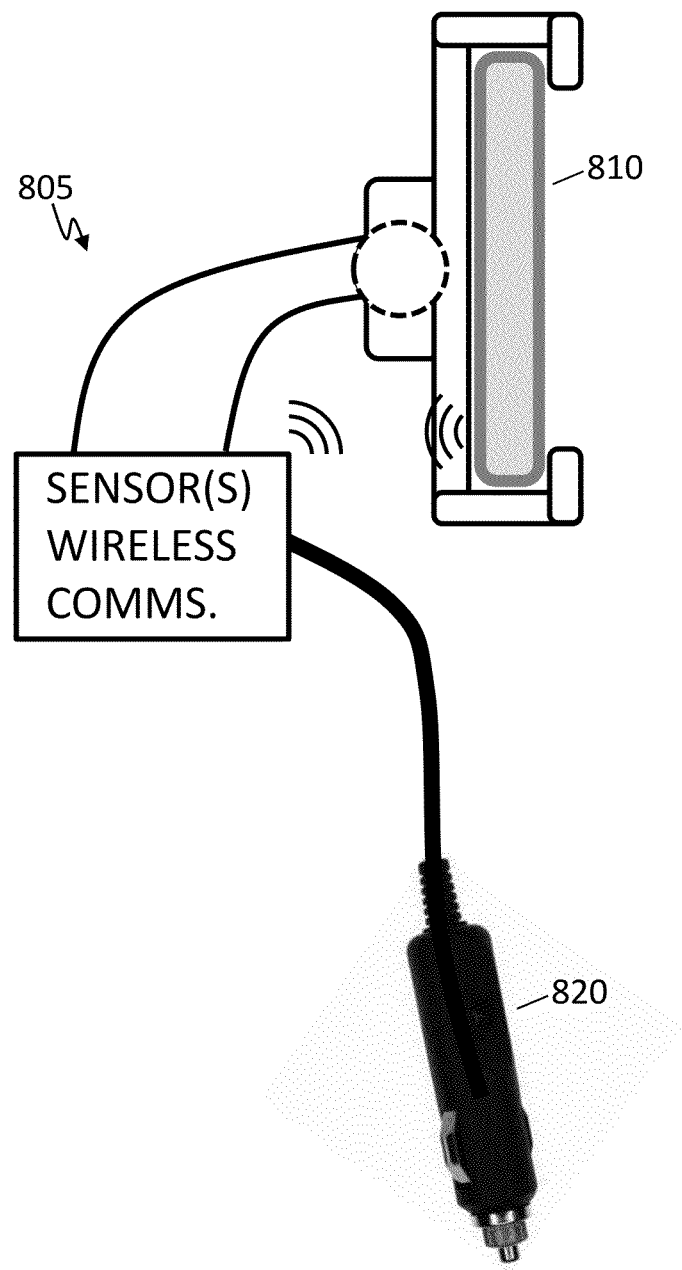
FIG. 8 shows an example of a smart-phone bracket for car and truck navigation having wireless connections for sensor input/output

FIG. 8 shows an example of a smart-phone bracket for car and truck navigation having wireless connections for sensor input/output. In FIG. 8, bracket 805 holds smart-phone 810. Bracket 805 includes sensors such as an altimeter or rate gyro. Communications between the sensor(s) and the smart-phone are transmitted wirelessly, for example using Bluetooth, Zig-Bee or Wi-Fi. An optional wire 820 connects the bracket to a vehicle power source.

The sensors in bracket 805 may include any of: accelerometers, gyros, GPS receiver, or altimeter. Usually the bracket supplies sensors that are not included in a smart-phone with the most common example being an altimeter. In the special case that a bracket provides all of the inertial sensors required for GPS+IMU car or truck navigation, the requirement to fix the orientation of the smart-phone with respect to the vehicle is removed. In this case the smart-phone provides a processor, memory and display which need not remain fixed inside a vehicle.

Figure 9:
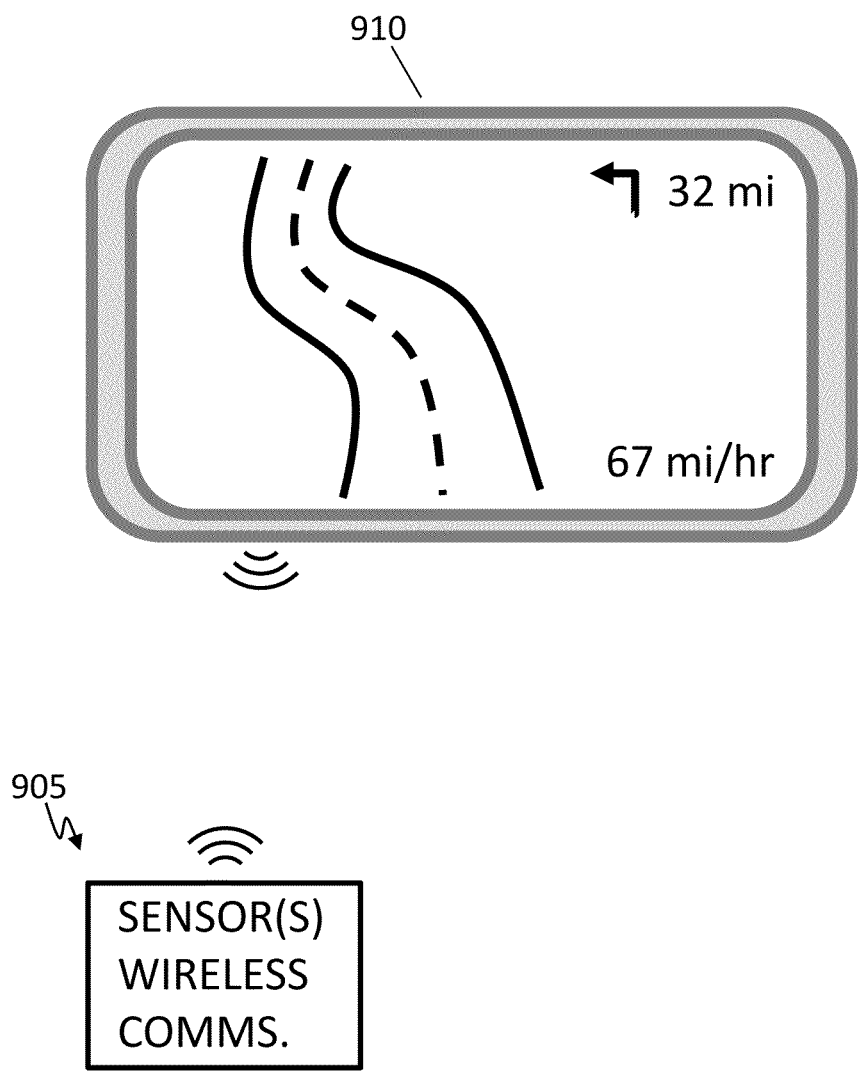
FIG. 9 shows an example of a smart-phone car and truck navigation system having a wireless connection between a sensor unit and a smart-phone.

FIG. 9 shows an example of a smart-phone car and truck navigation system having a wireless connection between a sensor unit and a smart-phone. In FIG. 9, sensor unit 905 communicates wirelessly with smart-phone 910. Sensor unit 905 is fixed to a vehicle and contains all of the inertial sensors necessary for GPS+IMU vehicle navigation: accelerometers, gyros and an altimeter. Smart-phone 910 contains a processor, memory and display. A GPS receiver may be included in sensor unit 905 or smart-phone 910. If smart-phone 910 contains a GPS receiver, then sensor unit 905 may be mounted in a vehicle without regard for whether or not GPS satellites are visible.

Figure 10:
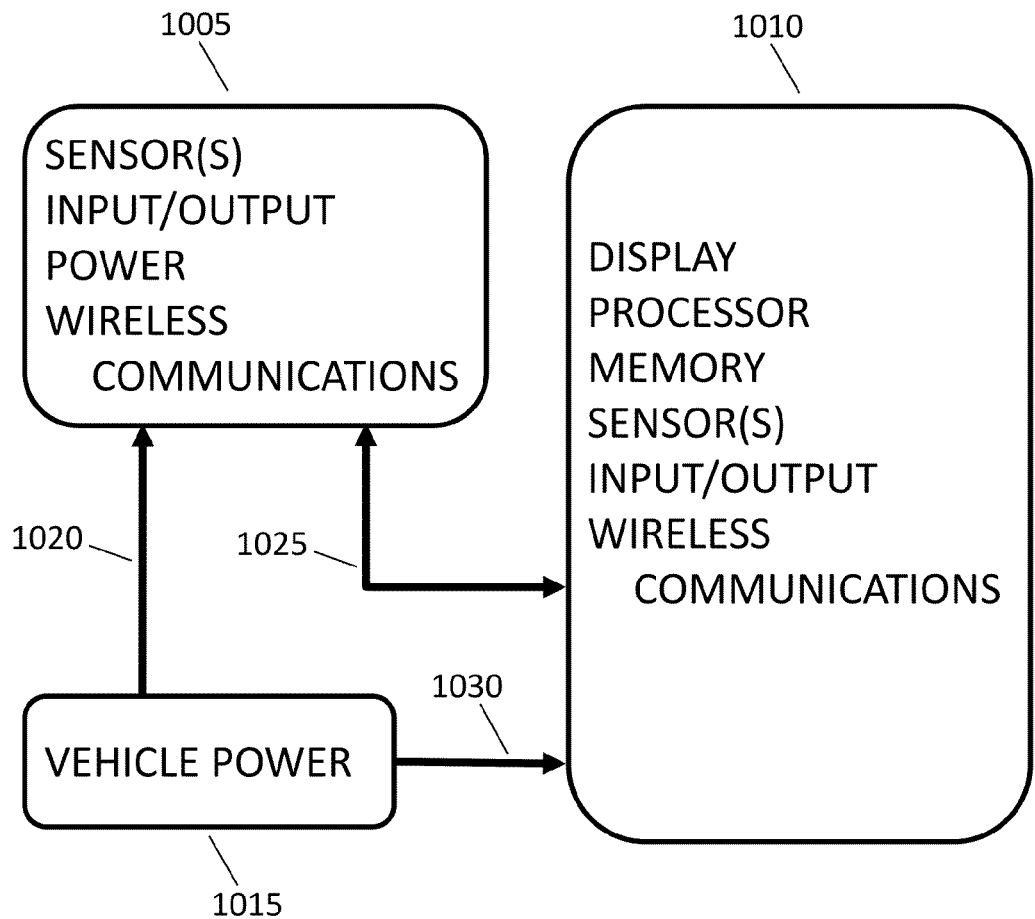
FIG. 10 is a block diagram of a GPS+IMU system implemented with a smart-phone and a smart-phone bracket in a car or truck.

FIG. 10 is a block diagram of a GPS+IMU system implemented with a smart-phone and a smart-phone bracket in a car or truck. In FIG. 10, bracket or sensor unit 1005 may communicate with smart-phone 1010 via wired or wireless data and/or power link 1025. Optional vehicle power 1015 is supplied to bracket or sensor unit 1005 and/or smart-phone 1010 via wired power links 1020 and 1030, respectively.

Smart-phone 1010 may be an advanced cell phone, a personal digital assistant, a tablet computer, or similar device. It need not include a cellular telephone. Smart-phone 1010 includes a display, a processor, memory, one or more optional sensors, data input and/or output ports, and wireless communications. Sensors in smart-phone 1010 may include a GPS receiver, an accelerometer, a rate-gyro, and an altimeter. The accelerometer and rate-gyro may perform measurements along three orthogonal axes. Wireless communications in smart-phone 1010 may include cellular telephone, Bluetooth, Wi-Fi, Wi-Max, or other communications technologies.

Bracket or sensor unit 1005 may contain one or more inertial sensors, data input and/or output ports, an optional power supply and optional wireless communications. Clearly, if optional data link 1025 is a wireless link, then bracket or sensor unit 1005 must include wireless communications capability.

The overall system depicted in FIG. 10 requires accelerometer and gyro inertial sensors, an altimeter and a GPS receiver; however, these sensors may be included in various combinations in the bracket or sensor unit and the smart-phone. The smart-phone may communicate with outside data sources via the internet or a private data network to obtain information such as map data, traffic, weather, nearby attractions, etc.

Smart-phones that include all necessary sensors for GPS+IMU navigation may use a bracket solely to provide a temporary, rigid attachment to a vehicle. In this case, the smart-phone executes software instructions to estimate position, heading and speed of the vehicle based on the smart-phone's own GPS and inertial sensors, and using the methods described above. To provide accurate position, heading and speed estimates the smart-phone detects when it is being securely held in its bracket by any of a number of different indications.

Perhaps the simplest indication that a smart-phone may use to determine that it is held in a bracket is an explicit instruction from a user. For example, a user may press a button, touch a screen, use gesture based inputs like shaking, waving or tapping, or use voice commands to indicate that the smart-phone should commence GPS+IMU navigation. Alternatively, the smart-phone may identify a bracket by detecting magnets, physical indentations, RFID tags, near-field communications devices, or other identifying bracket characteristics.

CONCLUSION

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A navigation system comprising:
a bracket for rigidly attaching a smart-phone to a car or truck such that inertial sensors in the smart-phone sense constrained vehicle motion rather than arbitrary motion, and;
a MEMS pressure altimeter included in the bracket for providing altitude data to the smart-phone for use in combination with inertial sensor data to estimate vehicle position, heading and speed.

2. The system of claim 1 further comprising:
a wire for connecting the bracket and the smart-phone, the wire capable of transmitting sensor data.

3. The system of claim 1 further comprising:
a wire for connecting the bracket and the smart-phone, the wire capable of transmitting electrical power.

4. The system of claim 1 further comprising:
a wireless system for transmitting data between the bracket and the smart-phone.

5. The system of claim 1 further comprising:
a wire for connecting the bracket and the car or truck, the wire capable of transmitting electrical power.

6. The system of claim 1, the bracket further comprising:
a pitch rate gyro and a yaw rate gyro.

7. The system of claim 6, the pitch rate and yaw rate gyros being MEMS gyros.

8. The system of claim 1, the bracket further comprising:
a longitudinal accelerometer.

9. The system of claim 8, the longitudinal accelerometer being a MEMS accelerometer.

10. The system of claim 1, the bracket further comprising:
a GNSS receiver.

11. The system of claim 1, the smart-phone being a tablet computer.

12. A navigation system comprising:
a sensor unit capable of being rigidly attached to a car or truck, the sensor unit comprising:
an altimeter,
a pitch rate gyro and yaw rate gyro,
a longitudinal accelerometer, and
a wireless system for sending sensor data to a smart-phone.

13. The system of claim 12, the sensor unit further comprising a GNSS receiver.

14. The system of claim 12, the altimeter comprising a MEMS pressure sensor.

15. The system of claim 12, the pitch rate and yaw rate gyros being MEMS gyros.

16. The system of claim 12, the longitudinal accelerometer being a MEMS accelerometer.

17. The system of claim 12 further comprising: a wire for connecting the sensor unit to the car or truck, the wire capable of transmitting electrical power.

18. The system of claim 12, the smart-phone being a tablet computer.

* * * * *